(12) United States Patent
Erwin et al.

(10) Patent No.: US 6,959,139 B2
(45) Date of Patent: Oct. 25, 2005

(54) OPTICAL FIBER MANAGEMENT SYSTEM AND METHOD AND FIBER BENDER THEREOF

(75) Inventors: Charles Matthew Erwin, San Jose, CA (US); Gary Curtis Gehrke, San Jose, CA (US); Narasinha Chandrakant Parasnis, San Jose, CA (US)

(73) Assignee: CIENA Corporation, Linthicum, MD (US)

( * ) Notice: Subject to any disclaimer, the term of this patent is extended or adjusted under 35 U.S.C. 154(b) by 0 days.

(21) Appl. No.: 10/698,626

(22) Filed: Nov. 3, 2003

(65) Prior Publication Data

US 2004/0165852 A1 Aug. 26, 2004

Related U.S. Application Data

(62) Division of application No. 09/916,980, filed on Jul. 27, 2001, now Pat. No. 6,674,951.

(51) Int. Cl.[7] .............................. G02B 6/00; G02B 6/36
(52) U.S. Cl. .......................................... 385/134; 385/86
(58) Field of Search ...................... 385/86, 134, 135, 385/136, 137, 139

(56) References Cited

U.S. PATENT DOCUMENTS

| | | | | |
|---|---|---|---|---|
| 4,372,511 A | * | 2/1983 | Knowles | 248/68.1 |
| 5,094,552 A | * | 3/1992 | Monroe et al. | 385/76 |
| 5,212,751 A | * | 5/1993 | Brownjohn | 385/75 |
| 5,347,603 A | * | 9/1994 | Belenkiy et al. | 385/86 |
| 5,461,690 A | * | 10/1995 | Lampert | 385/100 |
| 5,530,787 A | | 6/1996 | Arnett | |
| 5,640,476 A | * | 6/1997 | Womack et al. | 385/86 |
| 5,710,851 A | * | 1/1998 | Walter et al. | 385/86 |
| 6,134,370 A | * | 10/2000 | Childers et al. | 385/135 |
| 6,236,795 B1 | * | 5/2001 | Rodgers | 385/134 |
| 6,554,489 B2 | * | 4/2003 | Kent et al. | 385/86 |
| 6,629,783 B2 | * | 10/2003 | Ngo | 385/86 |

\* cited by examiner

*Primary Examiner*—Chandrika Prasad
(74) *Attorney, Agent, or Firm*—Michael R. Cammarata; Chad J. Billings (57) ABSTRACT

A fiber bending apparatus for bending an optical fiber in a networking device and an optical fiber management system and method are provided. The fiber bender has an arcuate main body which is attached to the end of an optical fiber above the male connector and partially including the connector boot, bending the fiber substantially orthogonal to a direction from which the fiber is connected to a line module of the networking device, i.e., substantially parallel to the faceplate of the line module. In this way, the optical fibers are made to bend away from the chassis of the networking device, thereby preventing them from being crushed when the door of the chassis is closed. The optical fibers are also shielded from inadvertent impacts when a technician is working on the networking device. By enabling the optical fibers to be easily directed and managed, the overall fiber density of the networking device may be increased, thereby increasing its bandwidth and information processing capabilities.

15 Claims, 6 Drawing Sheets

OPTICAL FIBER MANAGEMENT SYSTEM AND METHOD AND FIBER BENDER THEREOF

This application is a Divisional of application Ser. No. 09/916,980 filed on Jul. 27, 2001, now U.S. Pat. No. 6,674,951, the entire contents of which are hereby incorporated by reference and for which priority is claimed under 35 U.S.C. § 120.

BACKGROUND OF THE INVENTION

1. Field of the Invention

The invention relates to devices which employ optical fiber; more specifically, the invention relates to a device, system, and method of managing optical fibers in a way to keep them neat and protected from harm.

2. Description of Related Art

Modern computer and telecommunications networks are constantly growing more complex and have an ever-expanding need for bandwidth (the ability to accept, process, and/or transmit information). Many of the components used in such networks utilize optical transceivers and optical fibers as the means of communicating among and within the various components.

One of the ways that optical network components can be made more efficient is by providing them with a greater density of optical transceivers and fibers. One cannot merely increase the density on whim since optical fibers, however small they may be, do occupy space, and the housing or chassis in which they are disposed is finite in volume. Specific and carefully contemplated fiber connection schemes therefore must be employed.

Typically, optical transceivers are mounted in groups on a single card called a line module or line card. Often, optical fibers are connected directly to the transceivers, passing through the faceplate of the line module and terminating at the transceiver inside the line module. Such a connection system is known as an internal connect scheme. Internal connect schemes are difficult to service since the optical fibers were not easily disconnected from their respective optical transceivers. The most common connect scheme is an external connection scheme in which the optical fiber is connected to the transceiver via connection ports on the exterior of the faceplate of the line module.

Currently, one of the density limitations on a faceplate mounted cable interconnect scheme is the physical size of the connector. The industry standard as of the filing of this application in the United States is the SC style connector. In Europe, the standard connector in many countries is the FC style connector. Both SC and FC connectors are comparatively large compared to recent connectors developed by Lucent Technologies, specifically the LC connector. As fiber optic interconnect density increases, LC connectors gain in popularity, so much so that many component manufacturers are designing fiber optic transceivers that utilize an integral plastic housing with LC connectors (the female side of the connector is mounted to the transceiver and is accessible from outside the line module).

Under an industry multi-source agreement, the small form factor transceiver standard was created and adopted and has been distributed by component manufacturers so that all new small form factor transceivers follow a common package size and interconnect scheme. Many of these new small form factor transceivers are designed with an integral EMI clip that allows the part to be mounted at the front of a given line module (or other circuit pack) and protrude through the front of the equipment faceplate to make cable access easier.

Unfortunately, mounting small form factor transceivers on line module faceplates causes the fiber optic cable to enter the faceplate at an angle of incidence such that it becomes difficult to route the fiber away from the source and, at the same time, prevent the telecommunications equipment chassis doors from crushing the fiber optic cable when closed. Additionally, as the density of the cables increases, it becomes increasingly difficult for technicians to service the equipment without disrupting cables adjacent to the cables that need to be serviced. To address this problem, some cable manufacturers have developed custom boots integral with the cable assembly that bend the cable so as to avoid interference with the door of the chassis. However, current industry solutions are designed to exit the small form factor transceiver orthogonal to (i.e., straight out from) the module. These boots can be rotated slightly but will interfere with adjacent boots when the angle becomes too great.

One contemporary device has been produced by Siecor Operations. It is a stainless steel clip which fits along the base of the optical fiber and fits under the connector boot of an SC or FC connector. It acts like a spine for the cable, bending it roughly 90°. However, it has several problems associated with it. First, it is completely incompatible with LC connectors that do not have specific Siecor boots attached thereon. Second, it does not actually cover a significant amount of the cable; as a result, even though the cable is kept fairly rigid, the clip does not actually protect the fiber optic cable. A sharp blow by either the door of the chassis of a networking device or by an incautious technician can still damage the optical fiber cable. Finally, there is no way to tell precisely where on the optical fiber this device is supposed to be placed for optimal bending.

Another such contemporary device is produced by Corning Cable Systems and is a plastic clip compatible with LC connectors similar to the stainless steel Siecor clip described above. The Corning clip fails to support the bent portion of the fiber throughout the entire section of bent fiber. As such, the fiber may not lay properly in the Corning clip. Also, the Corning clip appears to be less than reliable when used with smaller width optical fibers. Specifically, optical fiber comes in a variety of widths, from 1.6 to 2.0 mm. The Corning clip does not hold fibers in the smaller end of that width range very securely at all.

Other similar contemporary fiber bending devices require a stiffening rib to provide support and strength for the fiber bender. These stiffening ribs increase the size of the fiber bender; as a result, adjacent fibers connected to the same LC connector (which typically accommodates two fibers very close together) are pushed apart, causing undue stress on the connector and thus the transceiver.

Other companies utilize external faceplate interconnect schemes which cannot utilize the current industry solutions. Moreover, some of the equipment already in the field utilizes LC connectors which are mounted internally to the faceplate where bending the cable is not required. A solution must be available which is compatible with LC connectors and yet removable so that existing networking devices that do not require fiber bending are still serviceable, bearing in mind that optical fibers are brittle and may break during removal, insertion, or servicing of line modules.

SUMMARY OF THE INVENTION

The invention is a fiber bending apparatus for bending an optical fiber in a networking device. It has an arcuate main body having a first end, a second end, and a central channel. The central channel is preferably disposed along the side of the main body substantially perpendicular to the curvature of the main body (i.e., the fiber bender curves up and away from a module faceplate and the channel is on the left or right side of the bender). The provision of the channel on the side of the bender allows the bender to support the bent fiber throughout the entire length of the bent portion of the fiber. If the channel were disposed on the top of the apparatus along the curvature of the bend of the main body, any fiber disposed therein might not lie flat along the bottom of the channel. However, placing the channel on the side of the apparatus provides support from both above and below the fiber via the walls of the main body.

The first end is shaped to receive in the central channel an optical fiber and the second end is shaped to receive in the central channel a connector boot disposed around the optical fiber. The fiber bending apparatus bends a fiber disposed in the central channel away from a chassis of the networking device, and preferably bends the fiber substantially orthogonal to a direction from which the fiber is connected to the line module. The arcuate main body has a radius of curvature substantially equal to the minimum industry-recommended bend radius for optical fiber. In this way, the fiber bender acts to provide as much clearance as possible between the optical fiber emerging from the line module and the chassis.

The fiber bending apparatus preferably includes a shoulder formed in the central channel at a predetermined distance from the second end. The shoulder narrows the central channel. When a connector boot is inserted into the second end of the apparatus, the shoulder is engaged by the fiber connector boot to thereby prevent the connector boot from being inserted into the fiber bending apparatus beyond the predetermined distance. In this way, the inventive fiber bender has a depth gauge to prevent the connector boot from being inserted too far into the bender. This feature is important, since should the connector be inserted too far into the bender, two fiber benders on adjacent optical fibers would interfere with each other and push the two optical fibers apart; this would put undue stress on both the optical fibers and the optical transceiver.

Preferably, at least the second end of the main body is resilient and forms a friction fit with a connector boot inserted therein. At least one retaining projection is formed in the central channel. Projections formed near the first end engage the optical fiber and help to prevent the fiber bending apparatus from easily falling off of the optical fiber, while projections formed near the second end engage the connector boot and also help to prevent the fiber bending apparatus from easily falling off of the optical fiber.

The invention also includes an optical fiber management system. An outer chassis is provided with inner support structure mounted within the chassis. A plurality of line modules are inserted and supported by the support structure, each of the line modules having a plurality of optical transducers connected to female connectors. A plurality of optical fibers each respectively terminating in connector boots and male connectors are matingly engageable with the female connectors. A plurality of fiber bending devices similar to those described above, are selectively attachable to the optical fibers. Each of the fiber bending devices includes an arcuate main body having a first end, a second end, and a central channel. The first end is shaped to receive in the central channel one of the optical fibers and the second end is shaped to receive in the central channel one of the connector boots disposed around the one of the optical fibers. The plurality of fiber bending devices bend the optical fibers away from the chassis substantially orthogonal to a direction from which the optical fibers are connected to the line modules.

The invention also includes a method of organizing and managing optical fibers in a networking device utilizing the inventive fiber bender discussed above.

DETAILED DESCRIPTION OF THE EMBODIMENTS

Description will now be given of the invention with reference to FIGS. 1–5E. It should be noted that the figures are exemplary in nature and are meant in no way to limit the scope of the invention.

Figure 1:
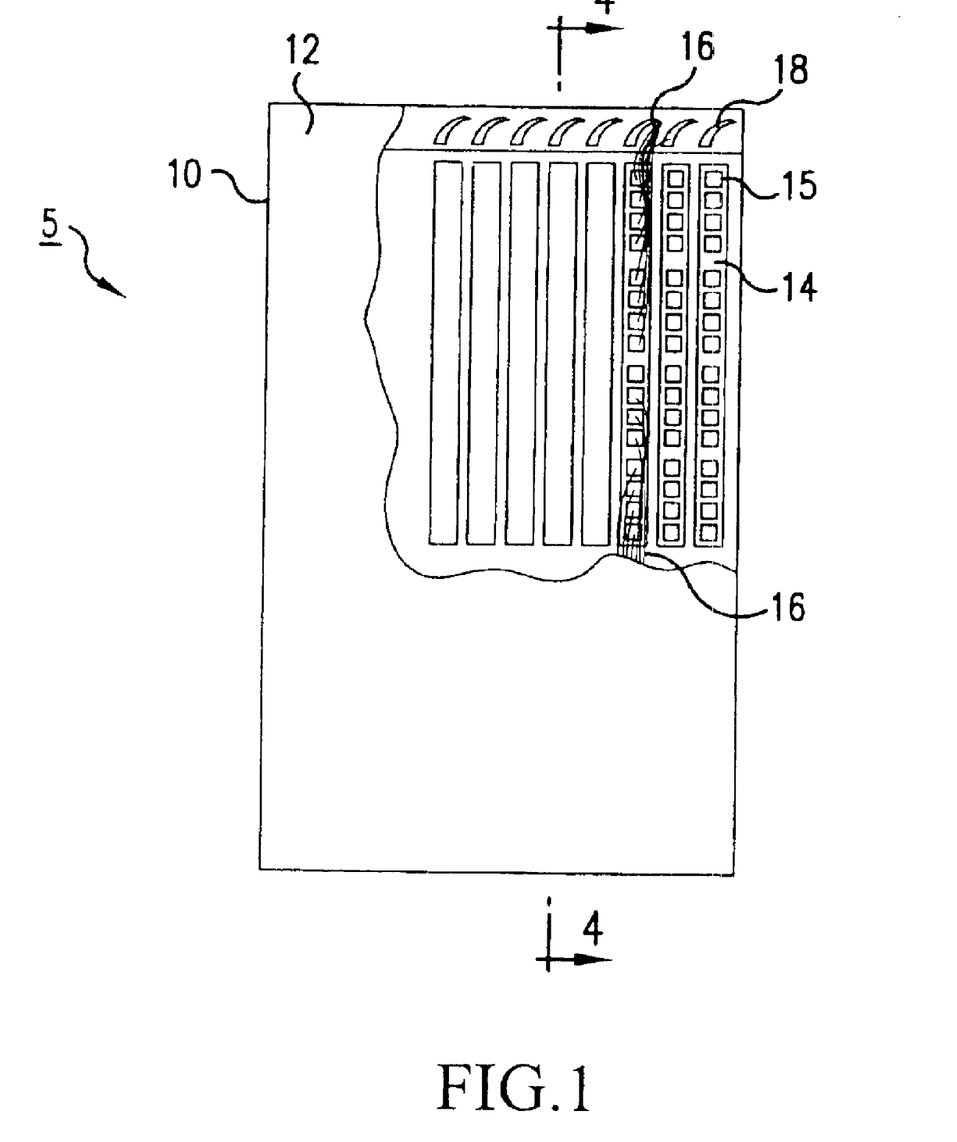
FIG. 1 is an overall schematic of a telecommunications networking device using the optical fiber management system according to an embodiment of the invention.

FIG. 1 depicts a schematic of a typical telecommunications networking device 5 usable in an optical network. Device 5 includes a chassis 10 which has an openable door 12 shown in broken view. Within the chassis is disposed some support structure (not shown) such as shelving, hooks, etc., for supporting a series of circuit boards or line modules 14. Previously, line modules were provided with eight optical transceivers each with their respective optical fibers being mounted internal to the faceplate of the line module (such a device is known as an LM-8). With the advent of the less bulky small form factor transceivers described above, the new standard of line modules is now being provided with sixteen optical transceivers (or an LM-16) in a faceplate mounted external interconnect scheme.

Figure 2:
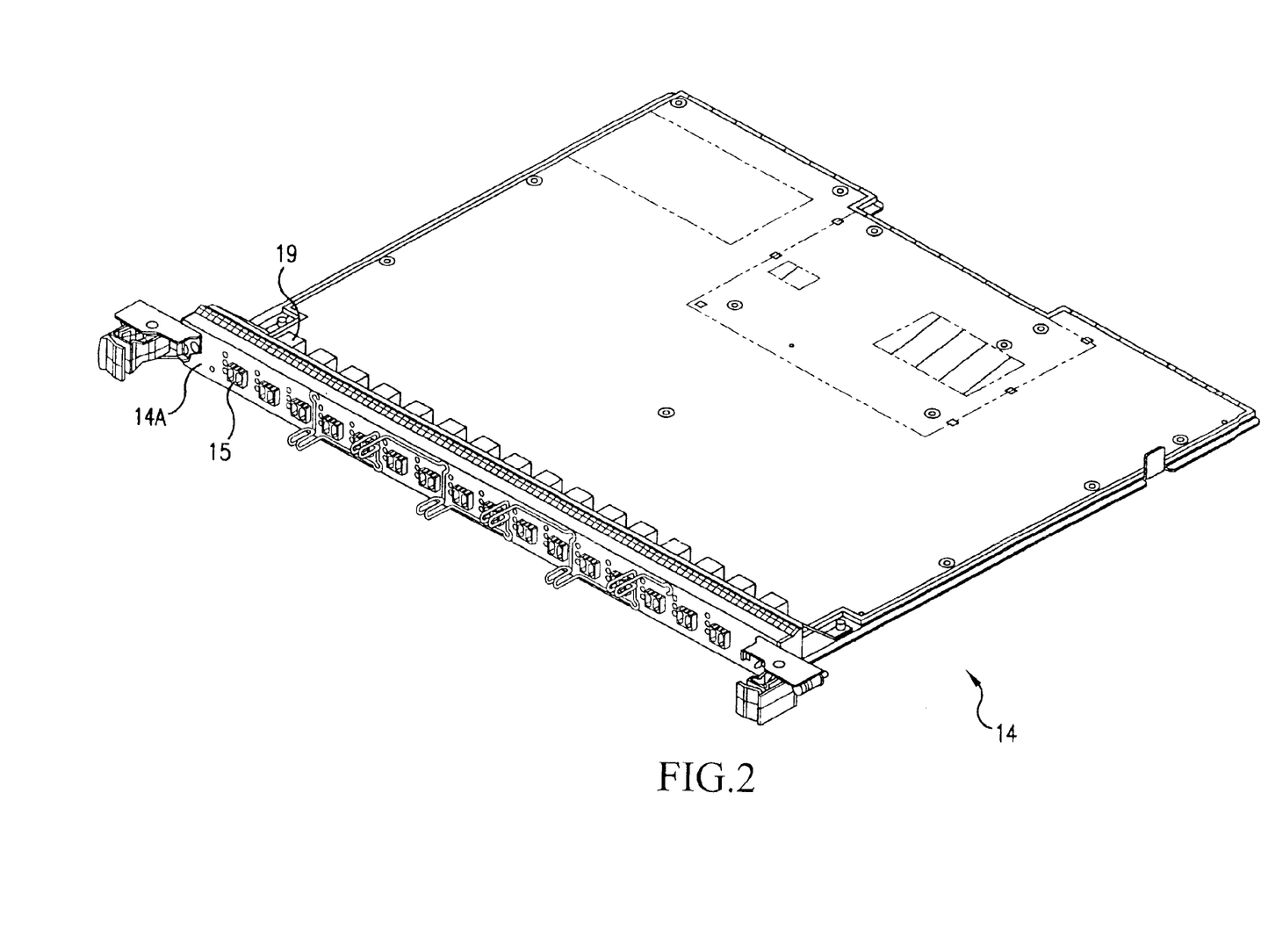
FIG. 2 is a perspective view of a line module component of the telecommunications device of FIG. 1.

FIG. 2 shows in perspective a typical modern line module 14. It is provided with sixteen female LC connectors 15 mounted on the faceplate 14A of the line module. Each female LC connector 15 has two receptacles, each one adapted to receive one optical fiber 16 (see FIG. 1) having a corresponding male LC connector (not shown) at its end. Each female LC connector 15 is respectively connected to an optical transceiver 19. Transceivers 19 are bi-directional; consequently, two optical fibers 16 are required for each transceiver (one for incoming signals and the other for outgoing signals). Line module 14 also includes one or more retaining levers 17 which secure the line module inside chassis 10 of networking device 5.

The device of FIG. 1 has a number of line modules 14 disposed inside chassis 10. Each line module requires up to 32 optical fibers 16 to be connected to LC connectors 15.

Should a device 5 have a mere sixteen line modules 14, the device could require as many as 512 optical fibers 16. Since the size of the chassis can be constrained by telecommunications industry standards, it is desirable to maintain some semblance of order and organization of the optical fibers which must be routed within a space-constrained chassis. To this end, the chassis is provided with cable routers 18 at the top and/or the bottom (not shown) of the inside of the chassis. As shown in FIG. 1, optical fibers 16 are routed in groups around cable routers 18 so as to keep them relatively segregated and orderly.

However, cable routers 18 alone are insufficient. Optical fibers 16 from one line module can interfere with those of a neighboring line module. Further, and more importantly, the optical fibers must be made to lie flat and run substantially along the faceplate of their line modules so that a) the closing of the chassis door does not crush and break the optical fibers, and b) a technician may service one line module without damaging or disrupting the optical fibers of an adjacent line module.

Figure 3A:
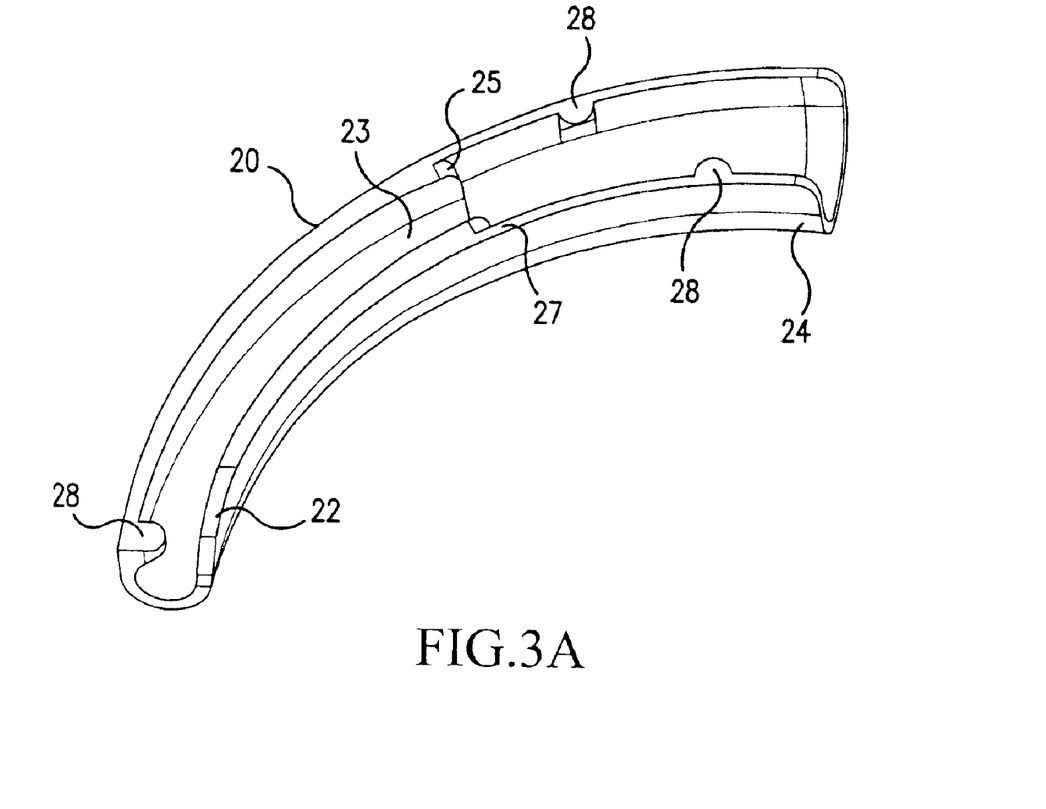
FIG. 3A is a perspective view of a fiber bender according to an embodiment of the invention.
Figure 3B:
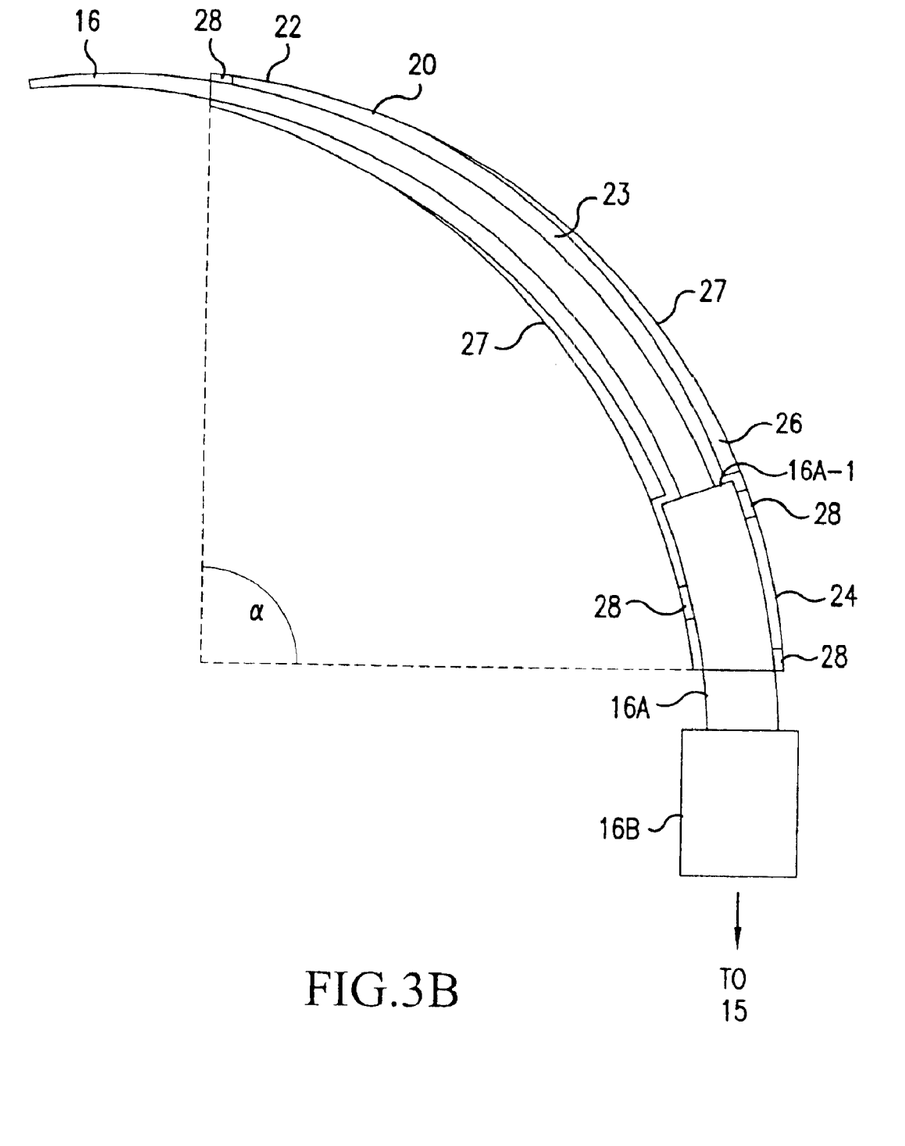
FIG. 3B is a side elevational view of the fiber bender of FIG. 3A with an optical fiber disposed therein.

To address these and other problems, an embodiment of the fiber optic management system includes a fiber bender 20 shown in FIG. 3; in FIG. 3A, it is shown by itself in perspective, and in FIG. 3B, it is shown in side elevation with an associated optical fiber. Fiber bender 20 includes an arcuate or horn-shaped main body having a first end 22 and a preferably larger second end 24. A central channel 23 is formed on the side of the main body and is surrounded by walls 27; in such a configuration, the cross-section of the main body is substantially in the shape of the letter "C" or a semi-circle, or similar such geometric shape. The provision of channel 23 on the side of the main body rather than the top of the main body enables fiber bender 20 to support the entire length of the bent portion of the fiber from both sides via walls 27. In this way, fiber bender 20 serves to maintain the proper bend radius throughout the entire length of the bent portion of the fiber.

As shown in FIG. 3B, the standard optical fiber 16 that is being fitted inside fiber bender 20 consists of the optical fiber cable itself, a connector boot 16A, and a male LC connector 16B. Connector 16B is matingly engageable with female LC connector 15 shown in FIG. 2. Connector boot 16A is provided around the fiber cable before it terminates in the male LC connector 16B to provide strain relief and protection for the cable as it emerges from the rear portion of LC connector 16B. The first end 22 of fiber bender 20 is adapted (i.e., shaped, dimensioned, designed, etc.) to receive the proximal or non-connector side of optical fiber 16 as shown in FIG. 3B. Second end 24 is preferably larger in width than first end 22 and is adapted to receive part of connector boot 16A. It is intended that fiber bender 20 cover part of connector boot 16A so that the bending of the fiber can begin as close to the connector 16B as possible, thereby reducing the amount the fiber sticks out perpendicularly from faceplate 14A.

However, it is important that the fiber bender not be fitted around the extreme lowermost portion of connector boot 16A. As shown in FIG. 2, the two female ports of a single LC connector 15 are extremely close together; there is barely enough room for two optical fibers 16 to be connected to the same LC connector 15. If the fiber benders of the two optical fibers were placed at the lowermost end of their respective connector boots 16A, the two fiber benders would add significantly to the overall diameter of the optical fibers, and the fibers would push against each other when they were connected to the same connector. This situation is unacceptable as it would produce undesirable stresses on the optical transceiver and the fibers themselves.

Consequently, it is important to control the depth to which the connector boots may be disposed inside the channels 23 of fiber benders 20. Shoulder 26 is formed on the interior of channel 23 so as to narrow the width of the channel. As the optical fiber is threaded into channel 23 and the connector boot 16A is inserted deeper into the fiber bender, the rear wall 16A-1 of connector boot 16A eventually abuts shoulder 26 and is thereby prevented from travelling further into channel 23. In this way, the fiber bender 20 is prevented from being placed too far down on the connector boot. Also, shoulder 26 acts as a depth gauge to insure that fiber bender 20 is placed sufficiently close to male LC connector 16B. One of the functions of fiber bender 20 is to bend the optical fiber away from the chassis door 12 so that the fiber will not stick out too far from faceplate 14A and thus be crushed when the door is closed. Fiber bender 20 minimizes the profile of the optical fiber. If fiber bender 20 is placed too high on the optical fiber (i.e., too far away from the connector end of the fiber), then the profile of the fiber may not be reduced sufficiently to avoid a closing chassis door. By inserting the connector boot 16A until it abuts shoulder 26, the profile of the optical fiber is sufficiently reduced in an easily repeatable manner.

Fiber bender 20 is an arc-shaped device that subtends an angle □ as shown in FIG. 3B. Since the optical fiber initially emerges from faceplate 14A perpendicular to faceplate 14A, and since it is desired to bend the fiber to be parallel to faceplate 14A, it is preferred that the fiber bender bend the fiber approximately 90°. It is borne in mind by the inventors that optical fiber, a standard article of commerce, has an industry-recommended minimum bend radius which is set to avoid breaking the optical fiber. As such, one skilled in the art will be cognizant of this minimum bend radius and will appreciate that the inventive fiber bender 20 is dimensioned so as not to bend an optical fiber any smaller than the industry-recommended bend radius.

In addition, bender 20 is provided with one or more projections 28, preferably along the tops of walls 27. These projections engage the cable or the connector boot (depending upon where the projections are formed on the bender) and help prevent the optical fiber from falling out of central channel 23.

The main body of fiber bender 20 is preferably made from a resilient material such as metal, plastic, or a similar material. The material is sufficiently stiff to withstand inadvertent impacts by technicians, however at least the second end 24 of the bender is resilient so that the connector boot of the optical fiber can be friction fitted therein.

Figure 4:
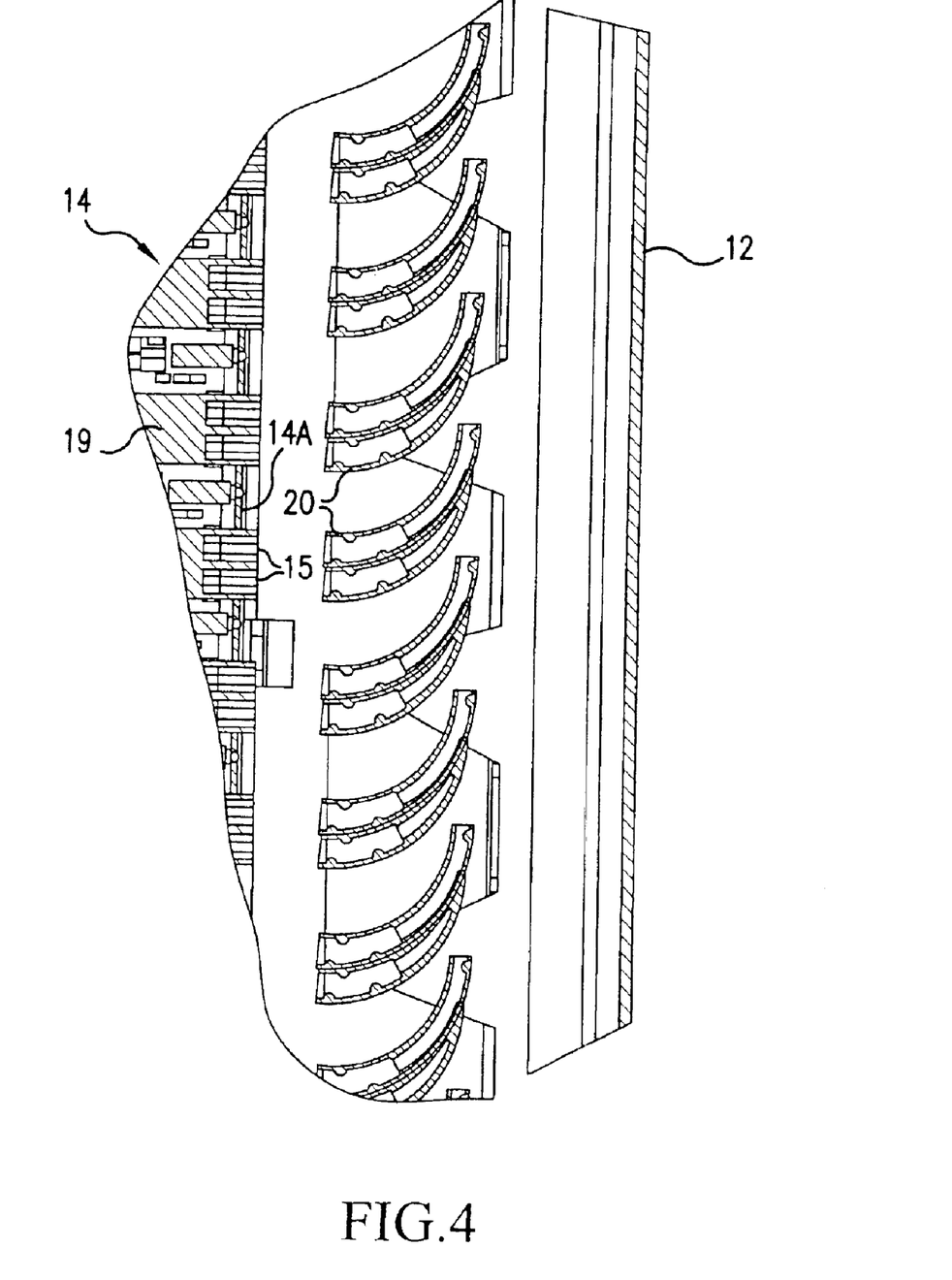
FIG. 4 is a sectional view of the optical fiber management system taken along line 4—4 of FIG. 1 with the connector boots and optical fiber cables not shown for clarity.

The overall inventive fiber management system can be seen in FIGS. 1 and 4. In FIG. 1, it is shown that some of the fibers 16 may be routed vertically upwards and that some of the fibers 16 may be routed vertically downwards. FIG. 4 demonstrates the flexibility of the inventive system (connector boots and the fibers themselves are not shown for clarity). FIG. 4 is a sectional view of the overall system of FIG. 1 taken along line IV—IV. As shown in FIG. 4, fiber benders 20 are disposed a predetermined distance from the faceplate 14A of line module 14, owing to connector boot 16A abutting shoulder 26 of the fiber bender.

It should be noted that every other fiber bender in FIG. 4 can be rotated slightly off the exact straight vertical line of line IV—IV (in FIG. 4, it is the lower fiber bender of each pair; of course, it could just as easily be the upper fiber bender). If the fibers were all aligned precisely vertically, the lower fiber of each pair of fibers would be overlapping its upper fiber neighbor. Such a configuration may be undesirable, as the overall profile of the fibers is increased and the chassis door may impact on the overlapping fiber. Also, by bending the lower fiber with the fiber bender and then bending the lower bent fiber over the upper bent fiber, undue stress may be created in the lower fiber. Consequently, the lower fiber is preferably rotated slightly off the vertical so as to avoid interfering with its neighboring fiber. The provision of channel 23 on the side of the main body of the fiber bender makes this rotation extremely easy. Providing channel 23 on the side rather than the top also insures that any inadvertent impacts with the optical fiber will strike the fiber bender and not the fiber itself; if the channel were formed in the top part of the main body, the fiber may be exposed to damaging impacts.

Figure 5A:
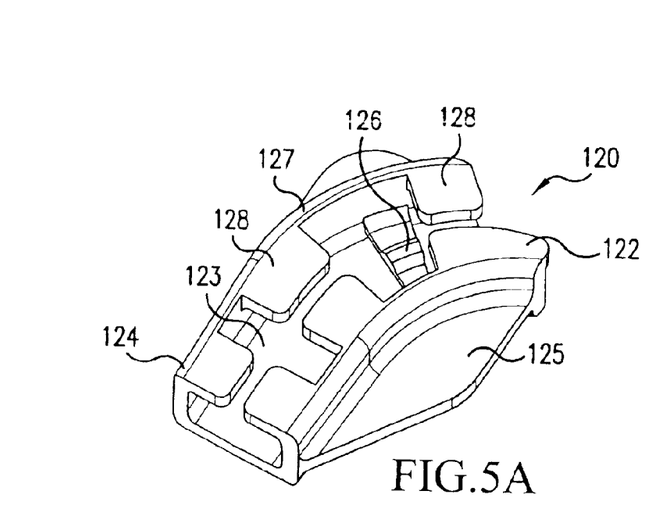
FIGS. 5A–C are alternate embodiments of the fiber bender invention which accommodate two adjacent optical fibers.

Alternate embodiments of the inventive fiber bender are shown in FIGS. 5A–D. Fiber benders 120, 220, and 320 differ slightly from the first embodiment of the bender 20 in that they accommodate both optical fibers for a given two-port LC connector. Thus, as shown in FIG. 5A, bender 120 has a first end 122 for receiving two optical fiber cables, and second end 124 is adapted to receive two connector boots 16A. Central channel 123 is wide enough to accommodate two fibers 16. At least one fin 125 may be provided to give bender 120 sufficient stiffness. Transverse stopper 126 prevents the connector boots from being inserted too far into bender 120 while providing lateral support for the bender. Projections 128 function similarly to projections 28 of the embodiment described in FIG. 3.

Figure 5B:
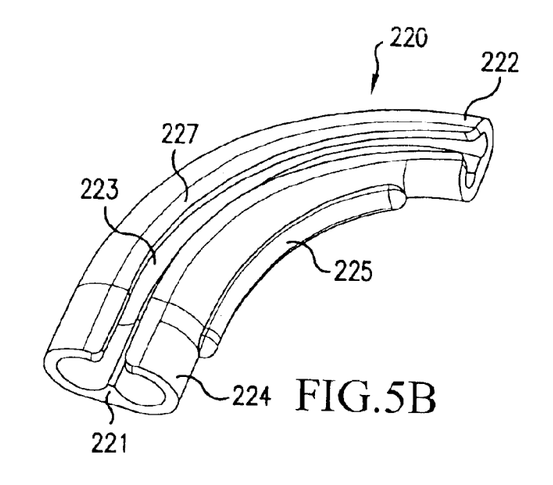

FIG. 5B depicts another alternate embodiment of the fiber bender. Bender 220 is also a two-fiber bender, having first end 222 and second end 224 as before. A central divider 221 is provided in channel 223 to keep the two optical fibers disposed in channel 223 reasonably apart from one another. Walls 227 come up much higher over central channel 223 so that they effectively act as projections which retain the optical fibers inside channel 223. A support rib 225 is provided for rigidity.

Figure 5C:
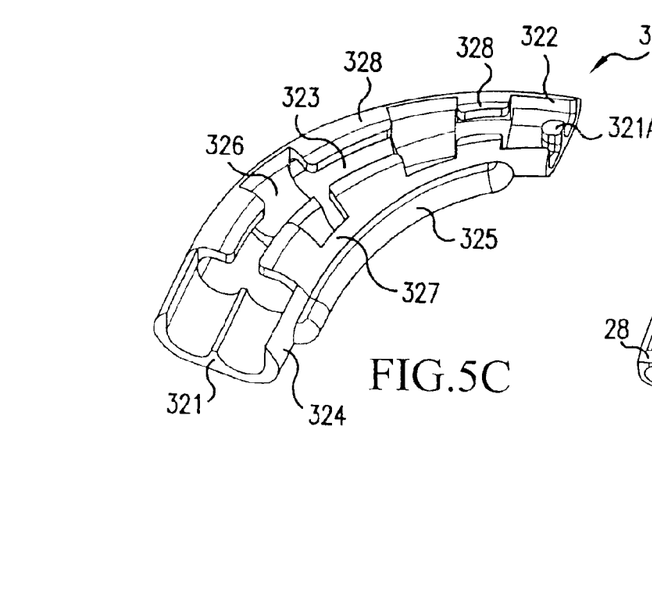

Bender 320 of FIG. 5C is similar to bender 120 of FIG. 5A with some slight modifications. Central divider 321 is provided at second end 324 to keep the connector boots properly spaced apart, while central divider post 321A is provided at first end 321 to separate the optical fiber cables. Support rib 325 is provided similar to rib 225 of FIG. 5B. Walls 327 and projections 328 are provided similar to walls 127 and projections 128 of FIG. 5A. Transverse rib 326 provides lateral support for the bender and allows the plastic injection mold tool to be simpler and more cost effective.

Figures 5D, 5E:
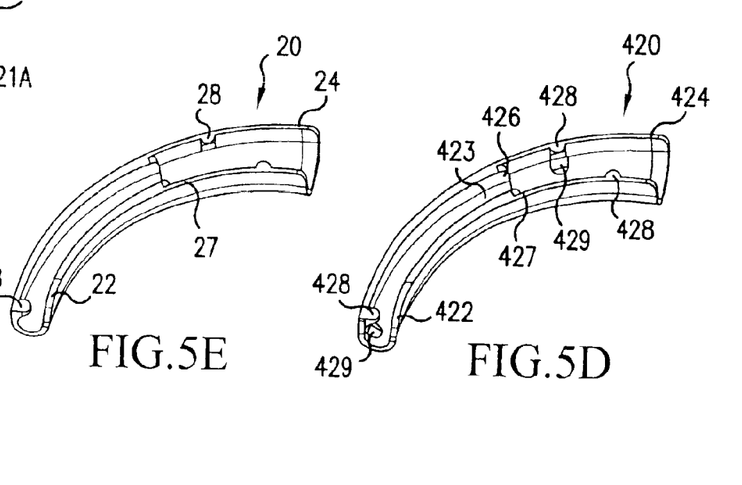
FIG. 5D is an alternate embodiment of the fiber bender of FIG. 3A.
FIG. 5E is the embodiment of FIG. 3A shown next to FIGS. 5A–D for comparative purposes.

FIG. 5D shows a single fiber bender 420 which is similar in many respects to bender 20 of FIG. 3. The various parts of FIG. 5D correspond to those referenced in FIG. 3 but with reference numerals in the 400s; e.g., ends 422 and 424 are substantially similar to ends 22 and 24 of FIG. 3, channel 423 and shoulder 426 are similar to channel 23 and shoulder 26 of FIG. 3, and walls 427 and projections 428 are similar to walls 27 and 28. Fiber bender 420 adds core cuts 429 (removed material) in channel 423 below projections 428. The provision of core cuts 429 serves to facilitate tooling and injection molding.

The invention is not limited to the above description but rather is defined by the claims appearing hereinbelow. Modifications to the above description that include that which is known in the art are well within the scope of the contemplated invention.

What is claimed is:

1. An optical fiber bending apparatus for connecting optical fiber to a chassis of a networking device, comprising:

a flexible tubular main body having;

a first end;

a second end;

at least one channel with at least two walls substantially parallel to each other, formed within said main body between said first end and said second end, said first end being shaped to receive in said channel at least one optical fiber and said second end being shaped to receive in said channel at least one connector boot disposed around said optical fiber; and a shoulder in the channel a predetermined distance from the second end, the shoulder creating two ledges that extend from the predetermined distance from the second end to the first end and extend a predetermined distance away from the channel walls, wherein said optical fiber is placed in said channel and the main body flexes thereby bending said optical fiber away from said chassis.

2. A method of organizing optical fibers in a networking device comprising the steps of:

attaching a plurality of fiber benders near respective bases of the optical fibers where the optical fibers connect to line modules, the fiber benders having a first end, a second end, and a central channel formed in a side of said main body; and providing a shoulder in the central channel a predetermined distance from the second end, the shoulder creating two ledges that extend from the predetermined distance from the second end to the first end and extend a predetermined distance away from the channel walls, wherein the fiber benders bend the optical fibers substantially orthogonal to the direction from which the optical fibers emerge from the line modules to which they are connected.

3. A method of organizing optical fibers according to claim 2, further comprising the step of connecting the optical fibers to LC connectors at least two fibers per LC connector.

4. A method of organizing optical fibers according to claim 3, wherein each of the fiber benders is attachable to a single optical fiber.

5. A method of organizing optical fibers according to claim 3, wherein each of the fiber benders is attachable to two optical fibers both connected to the same LC connector.

6. A method of organizing optical fibers according to claim 2, the optical fibers each having a connector boot disposed around the end of the fiber, further comprising the step of friction fitting the connector boot into the central channel at the second end of each fiber bender.

7. A method of organizing optical fibers according to claim 2, further comprising the step of rotating at least one of the optical fibers contained within one of the fiber bending devices so that the rotated fiber is not overlapping an adjacent optical fiber.

8. A method of organizing optical fibers according to claim 2, wherein an inserted fiber connector boot abuts against the two ledges, thereby preventing the connector boot from being inserted into the central channel beyond the predetermined distance.

9. A method of organizing optical fibers in a networking device comprising the steps of:

connecting optical fibers to the optical transducers via male and female connectors at a faceplate of the device; and attaching a plurality of fiber benders near respective bases of the optical fibers where the optical fibers terminate in the male connectors, the fiber benders having a flexible tubular main body having; a first end; a second end; and at least one channel formed within said main body between said first end and said second end, said first end being shaped to receive in said channel at least one optical fiber and said second end being shaped to receive in said channel at least one connector boot disposed around said optical fiber; and a shoulder in the central channel a predetermined distance from the second end, the shoulder creating two ledges that extend from the predetermined distance from the second end to the first end and extend a predetermined distance away from the channel walls, wherein when the optical fibers are respectively inserted into the central channels of the fiber benders, the fiber benders bend the fibers disposed in the central channels away from the chassis of the networking device.

10. A method of organizing optical fibers according to claim 9, the connectors being LC connectors, the method further comprising the step of connecting the optical fibers to female LC connectors at least two fibers per female LC connector.

11. A method of organizing optical fibers according to claim 10, wherein each of the fiber benders is attachable to a single optical fiber.

12. A method of organizing optical fibers according to claim 10, wherein each of the fiber benders is attachable to two optical fibers both connected to the same female LC connector.

13. A method of organizing optical fibers according to claim 9, wherein the fiber benders bend the optical fibers substantially parallel to the faceplates of the line modules to which they are connected.

14. A method of organizing optical fibers according to claim 9, wherein said disposing step further comprises the step of disposing the line modules vertically inside the chassis, and wherein said fiber benders bend the optical fibers into a substantially vertical direction.

15. A method of organizing optical fibers according to claim 14, further comprising the steps of:

arranging some of the fiber benders to bend some of the optical fibers vertically upwards; and arranging some of the fiber benders to bend some of the optical fibers vertically downwards.

* * * * *